United States Patent
Hicks et al.

(10) Patent No.: US 11,263,116 B2
(45) Date of Patent: Mar. 1, 2022

(54) CHAMPION TEST CASE GENERATION

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 16/256,949

(22) Filed: Jan. 24, 2019

(65) Prior Publication Data
US 2020/0242013 A1     Jul. 30, 2020

(51) Int. Cl.
*G06F 11/36*     (2006.01)

(52) U.S. Cl.
CPC ...... *G06F 11/3684* (2013.01); *G06F 11/3676* (2013.01); *G06F 11/3688* (2013.01); *G06F 11/3692* (2013.01)

(58) Field of Classification Search
CPC ............ G06F 11/3684; G06F 11/3676; G06F 11/3688; G06F 11/3692; G06F 11/2094; G06F 11/2069; G06F 3/0619; G06F 3/0659; G06F 3/0673; G06F 2201/805; G06F 2201/82
See application file for complete search history.

(56) References Cited

U.S. PATENT DOCUMENTS

| | | |
|---|---|---|
| 5,153,881 A | 10/1992 | Bruckert |
| 5,185,877 A | 2/1993 | Bissett |
| 5,410,634 A | 4/1995 | Li |
| 5,694,540 A | 12/1997 | Humelsine |
| 5,758,061 A | 5/1998 | Plum |
| 5,758,062 A | 5/1998 | McMahon |
| 6,182,245 B1 | 1/2001 | Akin et al. |

(Continued)

FOREIGN PATENT DOCUMENTS

| | | |
|---|---|---|
| JP | H05282272 A | 10/1993 |
| JP | H07121498 A | 5/1995 |

(Continued)

OTHER PUBLICATIONS

Yilmaz et al., "Moving forward with combinatorial interaction testing", Feb. 2014, 47(2), pp. 37-45.*

(Continued)

*Primary Examiner* — Matthew M Kim
*Assistant Examiner* — Matthew N Putaraksa
(74) *Attorney, Agent, or Firm* — Cantor Colburn LLP; Teddi Maranzano

(57) ABSTRACT

Systems, methods, and computer-readable media for identifying a champion test case that provides an increased likelihood of exposing a fault and expanding a set of test cases to include the champion test case are described. The fault may occur in a System Under Test (SUT), which may be a hardware system or a software system. A weight may be assigned to a champion test case that indicates the relative strength of the test case in detecting faults. The weight may be used to influence the selection of other test cases.

16 Claims, 3 Drawing Sheets

(56) References Cited

U.S. PATENT DOCUMENTS

| | | |
|---|---|---|
| 6,182,258 B1 | 1/2001 | Hollander |
| 6,378,097 B1 | 4/2002 | Fin et al. |
| 6,415,396 B1 | 7/2002 | Singh et al. |
| 6,601,018 B1 | 7/2003 | Logan |
| 6,718,286 B2 | 4/2004 | Rivin et al. |
| 6,718,485 B1 | 4/2004 | Reiser |
| 6,859,922 B1 | 2/2005 | Baker |
| 6,907,546 B1 | 6/2005 | Haswell et al. |
| 7,024,589 B2 | 4/2006 | Hartman et al. |
| 7,032,212 B2 | 4/2006 | Amir et al. |
| 7,093,238 B2 | 8/2006 | Givoni |
| 7,178,063 B1 | 2/2007 | Smith |
| 7,235,358 B2 | 6/2007 | Wohlgemuth |
| 7,315,634 B2 | 1/2008 | Martin |
| 7,363,495 B2 | 4/2008 | Wells |
| 7,386,839 B1 | 6/2008 | Golender |
| 7,552,425 B2 | 6/2009 | Bates et al. |
| 7,596,778 B2 | 9/2009 | Kolawa |
| 7,617,074 B2 | 11/2009 | Beish |
| 7,640,470 B2 * | 12/2009 | Lammel .............. G06F 11/3676 704/4 |
| 7,721,265 B1 | 5/2010 | Xu |
| 7,752,502 B2 | 7/2010 | Clee |
| 7,861,226 B1 | 12/2010 | Episkopos |
| 7,945,898 B1 | 5/2011 | Episkopos et al. |
| 7,958,400 B2 | 6/2011 | Ur |
| 7,962,798 B2 | 6/2011 | Locasto |
| 8,056,060 B2 | 11/2011 | Bicheno |
| 8,225,194 B2 | 7/2012 | Rechsteiner |
| 8,234,105 B1 | 7/2012 | Aldrich |
| 8,296,445 B1 | 10/2012 | Hackborn |
| 8,296,605 B2 | 10/2012 | John |
| 8,301,757 B2 | 10/2012 | Catlin |
| 8,370,816 B2 | 2/2013 | Farchi et al. |
| 8,479,171 B2 | 7/2013 | Ghosh |
| 8,504,997 B2 | 8/2013 | Tkachuk et al. |
| 8,527,813 B2 | 9/2013 | Budnik |
| 8,549,480 B2 | 10/2013 | Cohen et al. |
| 8,554,811 B2 | 10/2013 | Mariani |
| 8,639,625 B1 | 1/2014 | Ginter |
| 8,649,995 B2 | 2/2014 | Thulasidasan et al. |
| 8,666,723 B2 | 3/2014 | Xie |
| 8,694,958 B1 | 4/2014 | Potter |
| 8,756,460 B2 | 6/2014 | Blue et al. |
| 8,775,886 B2 | 7/2014 | Mellen |
| 8,806,450 B1 | 8/2014 | Maharana |
| 8,813,033 B2 | 8/2014 | Sreedhar |
| 8,856,129 B2 | 10/2014 | Cai |
| 8,874,477 B2 | 10/2014 | Hoffberg |
| 8,935,673 B1 | 1/2015 | Ashkenazi |
| 8,949,674 B2 | 2/2015 | Mancoridis |
| 8,954,926 B2 | 2/2015 | Braun et al. |
| 8,954,930 B2 | 2/2015 | Kamenz |
| 8,966,453 B1 | 2/2015 | Zamfir |
| 8,997,061 B1 | 3/2015 | Davison |
| 9,009,538 B2 | 4/2015 | D'Alterio et al. |
| 9,037,915 B2 | 5/2015 | D'Alterio et al. |
| 9,063,899 B2 | 6/2015 | Epstein |
| 9,098,635 B2 | 8/2015 | Peri-Glass et al. |
| 9,104,804 B2 | 8/2015 | Best |
| 9,111,033 B2 * | 8/2015 | Bates ................. G06F 11/3624 |
| 9,141,520 B2 | 9/2015 | Zheng |
| 9,202,005 B2 | 12/2015 | Goswami et al. |
| 9,286,313 B1 | 3/2016 | Sharangpani |
| 9,317,410 B2 | 4/2016 | Eilam et al. |
| 9,336,122 B2 | 5/2016 | Kilzer et al. |
| 9,454,466 B2 | 9/2016 | Ivrii et al. |
| 9,489,289 B2 | 11/2016 | Hu |
| 9,513,998 B2 | 12/2016 | Coronado |
| 9,529,701 B2 | 12/2016 | Ekambaram et al. |
| 9,600,241 B2 | 3/2017 | Shankar et al. |
| 9,600,401 B1 | 3/2017 | Haischt et al. |
| 9,600,403 B1 | 3/2017 | Raz |
| 9,626,277 B2 | 4/2017 | Thangamani |
| 9,720,766 B2 | 8/2017 | Lee |
| 9,734,263 B2 | 8/2017 | Kohavi et al. |
| 9,779,013 B2 | 10/2017 | Narayan et al. |
| 9,857,959 B2 | 1/2018 | Dhawal |
| 9,864,675 B2 | 1/2018 | Ug |
| 9,916,414 B2 | 3/2018 | Jeong |
| 10,073,763 B1 | 3/2018 | Raman |
| 9,990,272 B2 | 6/2018 | Cooper |
| 9,996,452 B2 | 6/2018 | Cooper et al. |
| 10,061,685 B1 | 8/2018 | White |
| 10,152,479 B1 | 12/2018 | Granstrom |
| 10,235,277 B2 | 3/2019 | Herzig et al. |
| 10,270,748 B2 | 4/2019 | Briceno |
| 10,282,274 B2 | 5/2019 | Mola |
| 10,296,446 B2 | 5/2019 | D'Andrea et al. |
| 10,338,993 B1 * | 7/2019 | Lekivetz ............. G06F 11/0709 |
| 10,383,553 B1 | 8/2019 | Glenn |
| 10,417,282 B1 | 9/2019 | Zuber |
| 10,430,318 B1 | 10/2019 | Ansari |
| 10,545,855 B1 | 1/2020 | Jayaswal |
| 10,560,539 B1 | 2/2020 | Loch et al. |
| 10,637,853 B2 | 4/2020 | Lindemann |
| 10,713,151 B1 | 7/2020 | Zinger et al. |
| 10,754,756 B2 | 8/2020 | Ocariza, Jr. et al. |
| 10,776,464 B2 | 9/2020 | Wilson |
| 2003/0233600 A1 * | 12/2003 | Hartman ........ G01R 31/318307 714/32 |
| 2004/0154001 A1 | 8/2004 | Haghighat et al. |
| 2006/0070048 A1 | 3/2006 | Li et al. |
| 2006/0179386 A1 * | 8/2006 | Pushpavanam ..... G06F 11/3688 714/742 |
| 2008/0065931 A1 | 3/2008 | Coulter |
| 2008/0104577 A1 * | 5/2008 | Holden ............... G06F 11/3692 717/126 |
| 2008/0148236 A1 | 6/2008 | Huang et al. |
| 2008/0163165 A1 | 7/2008 | Shitrit |
| 2008/0172652 A1 | 7/2008 | Davia et al. |
| 2009/0249123 A1 | 10/2009 | Chow |
| 2010/0023928 A1 | 1/2010 | Hentschel et al. |
| 2010/0064190 A1 * | 3/2010 | Ward ............. G01R 31/318536 714/726 |
| 2010/0100871 A1 * | 4/2010 | Celeskey ............... G06F 11/008 717/124 |
| 2010/0287534 A1 | 11/2010 | Vangala et al. |
| 2011/0016457 A1 | 1/2011 | Artzi et al. |
| 2011/0145653 A1 | 6/2011 | Broadfoot |
| 2012/0191443 A1 * | 7/2012 | Amalfitano ......... G06F 11/3684 703/22 |
| 2012/0253728 A1 * | 10/2012 | Chamas .............. G06F 11/2294 702/109 |
| 2012/0260132 A1 * | 10/2012 | Blue .................. G06F 11/3676 714/38.1 |
| 2013/0103983 A1 | 4/2013 | Tzoref-Brill et al. |
| 2013/0125090 A1 * | 5/2013 | Durand .................... G06F 8/30 717/106 |
| 2013/0152047 A1 | 6/2013 | Moorthi |
| 2014/0013307 A1 | 1/2014 | Hansson |
| 2014/0059081 A1 | 2/2014 | Farchi et al. |
| 2014/0095933 A1 * | 4/2014 | Griesinger .......... G06F 11/3688 714/32 |
| 2014/0245267 A1 * | 8/2014 | Wang ................. G06F 11/3684 717/124 |
| 2014/0372083 A1 | 12/2014 | Hsu et al. |
| 2015/0094997 A1 | 4/2015 | Ivrii et al. |
| 2015/0106653 A1 | 4/2015 | Adler et al. |
| 2015/0378879 A1 * | 12/2015 | Ding ................... G06F 11/3688 714/38.1 |
| 2016/0140027 A1 | 5/2016 | Ug |
| 2016/0305853 A1 * | 10/2016 | Senf ...................... G06F 30/20 |
| 2016/0378618 A1 | 12/2016 | Cmielowski et al. |
| 2017/0060734 A1 | 3/2017 | Raz et al. |
| 2017/0083429 A1 * | 3/2017 | Pekelis .............. G06F 11/3612 |
| 2017/0103013 A1 | 4/2017 | Grechanik |
| 2017/0132119 A1 | 5/2017 | Xu et al. |
| 2017/0199810 A1 * | 7/2017 | Hamilton, II ........ G06F 11/3672 |
| 2017/0220800 A1 * | 8/2017 | Niemela ............. H04L 63/1433 |
| 2017/0262361 A1 * | 9/2017 | Francis .............. G06F 11/3672 |
| 2017/0270035 A1 | 9/2017 | Nie |
| 2018/0024911 A1 | 1/2018 | Kruszewski et al. |

(56) References Cited

U.S. PATENT DOCUMENTS

| | | | |
|---|---|---|---|
| 2018/0052725 | A1 | 2/2018 | Hannson |
| 2018/0095867 | A1 | 4/2018 | Varadarajan et al. |
| 2018/0121336 | A1 | 5/2018 | Ayyappan et al. |
| 2018/0189609 | A1* | 7/2018 | Park .................. G06K 9/00979 |
| 2018/0293156 | A1 | 10/2018 | Zeng |
| 2018/0300226 | A1* | 10/2018 | Manolios ................. G06F 8/20 |
| 2018/0314577 | A1 | 11/2018 | Gorjiara et al. |
| 2018/0329807 | A1* | 11/2018 | Atyam ................ G06F 11/3684 |
| 2019/0018761 | A1 | 1/2019 | Ramraz |
| 2019/0332523 | A1* | 10/2019 | Gefen ................. G06F 11/3688 |
| 2019/0334807 | A1* | 10/2019 | Clark .................. H04L 43/0817 |
| 2019/0370274 | A1 | 12/2019 | Yokoyama |
| 2020/0201741 | A1 | 6/2020 | Saha et al. |
| 2020/0201822 | A1 | 6/2020 | Wang |
| 2020/0213199 | A1 | 7/2020 | Sethi |
| 2020/0242011 | A1 | 7/2020 | Hicks |
| 2020/0242012 | A1 | 7/2020 | Hicks |
| 2020/0242013 | A1 | 7/2020 | Hicks |
| 2020/0242016 | A1 | 7/2020 | Hicks et al. |
| 2021/0156911 | A1* | 5/2021 | Motika .............. G01R 31/3172 |
| 2021/0349812 | A1* | 11/2021 | Culibrk ................... A63F 13/70 |

FOREIGN PATENT DOCUMENTS

| | | |
|---|---|---|
| JP | H07139507 A | 12/1995 |
| WO | 2016138953 A1 | 9/2016 |
| WO | 2018162048 A1 | 9/2018 |

OTHER PUBLICATIONS

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

Anonymously Disclosed "Simple Automated Code Coverage Method for test metrics", IP.com No. IPCOM000201864D, Publication Date: Nov. 29, 2010, 6 pages.

Anonymously Disclosed "Structured enhanced breakpoint chain", IP.com No. IPCOM000244264D, Publication Date: Nov. 27, 2015, 4 pages.

Anonymously Disclosed "System and method for improved regression failure analysis and easier debugging of test failures", IP.com No. IPCOM000209599D, Publication Date: Aug. 10, 2011, 6 pages.

Astigarrage, Tara "IBM Test Overview and Best Practices", IBM, Nov. 2012, pp. 1-53.

Cohen, D. M. et al., "The AETG system: An approach to testing based on combinatorial design." IEEE Transactions on Software Engineering, 23(7), pp. 437-444. Jul. 1997.

Compuware Corporation "Validate Testing Thoroughness and Provide Application Analysis", 2014, 4 pages.

De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.

Devai, Gergely et al., "UML Model Execution via Code Generation" Eotvos Lorand University, Faculty of Informatics, Budapest, Hungary 2017, pp. 9-15.

Hicks et al., "Fault Detection and Localization to Generate Failing Test Cases Using Combinatorial Test Design Techniques", U.S. Appl. No. 16/256,388, filed Jan. 24, 2019.

Hicks et al., "Combinatoric Set Completion Through Unique Test Case Generation", U.S. Appl. No. 16/256,394, filed Jan. 24, 2019.

Hicks et al., "Fault Detection and Localization Using Combinatorial Test Design Techniques While Adhering to Archtiectural", U.S. Appl. No. 16/256,391, filed Jan. 24, 2019.

Hicks et al., "Reduction of Test Infrastructure", U.S. Appl. No. 16/440,781, filed Jun. 13, 2019.

Hicks et al., "Self Healing Software Utilizing Regression Test Fingerprints", U.S. Appl. No. 16/440,833, filed Jun. 13, 2019.

Hicks et al., "Test Space Analysis Across Multiple Combinatoric Models", U.S. Appl. No. 16/256,388, filed Jan. 24, 2019.

Hicks et al., "Associating Attribute Seeds of Regression Test Cases With Breakpoint Value-Based Fingerprints," U.S. Appl. No. 16/440,857, filed Jun. 13, 2019.

Hicks et al., "Breakpoint Value-Based Version Control," U.S. Appl. No. 16/440,800, filed Jun. 13, 2019.

Hicks et al., "Customizable Test Set Selection Using Code Flow Trees," U.S. Appl. No. 16/440,751, filed Jun. 13, 2019.

Hicks et al., "Fault Detection Using Breakpoint Value-Based Fingerprints of Failing Regression Test Cases," U.S. Appl. No. 16/440,810, filed Jun. 13, 2019.

Hicks et al., "Regression Test Fingerprints Based on Breakpoint Values," U.S. Appl. No. 16/440,404, filed Jun. 13, 2019.

IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.

IBM, "InspectioN Testing Using Debugging Capabilities to Allow Combinational Testing", IP.com No. IPCOM000188370D, Electronic Publication Date: Oct. 2, 2009, 3 pages.

IBM, "Tool and Strategy for testing and validating software components at the source code level", IP.com No. IPCOM000180330D, Publication Date: Mar. 6, 2009, 3 pages.

IBM, Method of preventing build failures by searching through levels in a multi-level revision control system IP.com No. IPCOM000179779D, Publication Date: Feb. 25, 2009, 3 pages.

Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.

Kuhn, Rick "Introduction to Combinatorial Testing", NIST, Carnegie-Mellon University, Jun. 7, 2011, 48 pages.

Leon et al., "An empirical evaluation of test case filtering techniques based on exercising complex information flows," Proceedings of the 27th International Conference on Software Engineering, pp. 412-421. ACM, 2005.

Kamalakar, Sunil, "Automatically Generating Tests from Natural Language Descriptions of Software Behavior," Virginia Polytechic Institute and State University, Sep. 23, 2013. 72 pages.

List of IBM Patents or Patent Applications Treated as Related; Date Filed: Jul. 10, 2019, 2 pages.

Mathur et al., "Adaptive Automation: Leveraging Machine Learning to Support Uninterrupted Automated Testing of Software Applications" arXiv.org, Aug. 4, 2015. 6 pages.

Nguyen et al., "Combining model-based and combinatorial testing for effective test case generation," Proceedings of the 2012 International Symposium on Software Testing and Analysis, Jul. 15-20, 2012. pp. 100-110.

Petke, J. et al., "Efficiency and early fault detection with lower and higher strength combinatorial interaction testing". In Proceedings of

(56) References Cited

OTHER PUBLICATIONS the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
Pershin et al., "Solving mazes with memristors: A massively parallel approach," Physical Review E, vol. 84, No. 4, 2011, 046703, 6 pages.
Li et al., "Training itself: Mixed-signal training acceleration for memristor-based neural network," 19th Asia and South Pacific Design Automation Conference (ASP-DAC), 2014, pp. 361-366.
Lehmann et al., "A Generic Systolic Array Building Block for Neural Networks with On-Chip Learning," IEEE Transactions on Neural Networks, vol. 4, No. 3, 1993, pp. 400-407.
Chippa et al., "StoRM: a stochastic recognition and mining processor," 2014 International Symposium on Low Power Electronics and Design, 2014, pp. 39-44.
Chua, "Resistance switching memories are memristors," Applied Physics A, vol. 102, No. 4, 2011, pp. 765-783.
Soudry et al., "Memristor-Based Multilayer Neural Networks With Online Gradient Descent Training," IEEE Transactions on Neural Networks and Learning Systems, 2015.
Willmor, David, and Suzanne M. Embury. "A safe regression test selection technique for database-driven applications." 21st IEEE International Conference on Software Maintenance (ICSM'05). IEEE, 2005.pp. 1-10 (Year: 2005).
Andalib et al., "A Novel Key Generation Scheme for Biometric Cryptosystems Using Fingerprint Minutiae," IEEE, pp. 1-6 (Year: 2013).
Anonymous, "Combining Combinatorial Models while Maintaining Full Coverage," Jun. 25, 2016, 5 Pages.
Anonymous, "Explaining a Combinatorial Test Plan Using Hole Analysis" May 20, 2012; 4 pages.
Anonymous, "Integration of Combinatorial Testing Design with Automated Testing to Develop Smart Automated Test Suites," Jan. 6, 2015, 3 pages.
Anonymous, "Method and System for Optimizing Combinatorial Test Design (CTD) to Test a Mobile Application in Different Devices," Feb. 10, 2015, 2 pages.
Biswas, "Network-on-Chip Intellectual Property Protection Using Circular Path-based Fingerprinting," ACM, pp. 1-22 (Year: 2020).
Bromme et al., "A Conceptual Framework for Testing Biometric Algorithms within Operating Systems' Authentication", ACM, pp. 273-280 (Year: 2002).
Brumley et al., "Towards Automatic Discovery of Deviations in Binary Implementations with Applications to Error Detection and Fingerprint Generation," 16th USENIX Security Symposium, 2007, pp. 213-228.
Bryant et al., "Verification of Arithmetic Circuits with Binary Moment Diagrams," Proceedings of the 32nd ACM/IEEE design automation conference, 535-541, 1995.
Bures et al., "Tapir: Automation Support of Exploratory Testing Using Model Reconstruction of the System Under Test," IEEE, pp. 557-580 (Year: 2018).
Chakrabarti et al., "Specification Based Regression Testing Using Explicit State Space Enumeration," IEEE, pp. 1-6 (Year: 2006).
Esmaeili et al., "A Robust and Fast Video Copy Detection System Using Content-Based Fingerprinting," pp. 213-226 (Year: 2011).
Fang et al., "Identifying Test Refactoring Candidates with Assertion Fingerprints," ACM, pp. 125-137 (Year: 2015).
Fujita et al., "Multi-Terminal Binary Decision Diagrams: An Efficient Data Structure for Matrix Representation," Formal Methods in System Design—FMSD, vol. 10, No. 2/3, pp. 149-169, 1997.
Ghandehari et al., "Fault Localization Based on Failure-Inducing Combinations," IEEE 24th International Symposium on Software Reliability Engineering, 2013, pp. 168-177.
Giugno et al., "GraphGrep: A Fast and Universal Method for Querying Graphs," IEEE, pp. 112-115 (Year: 2002).
Graves et al., "An empirical study of regression test selection techniques," ACM Trans. Softw. Eng. Methodol., 184-208 (2001).
Grindal et al., "Combination testing strategies: a survey," Softw. Test. Verif. Reliab. 15(3), 167-199 (2005).
Gu et al., "Multi-Aspect, Robust, and Memory Exclusive Guest OS Fingerprinting," IEEE, pp. 380-394 (Year: 2014).
Jain et al., "Fingerprint Matching," IEEE, pp. 36-44 (Year: 2010).
Kuhn, R., "Practical Applications of Combinatorial Testing," Mar. 2012.
Maughan, C., "Test Case Generation Using Combinatorial Based Coverage for Rich Web Applications," 2012.
Memon, Atif M., and Qing Xie. "Studying the fault-detection effectiveness of GUI test cases for rapidly evolving software." IEEE transactions on software engineering 31.10 (2005): pp. 884-896. (Year: 2005).
Mishchenko, A., "An Introduction to Zero-Suppressed Binary Decision Diagrams," Proceedings of the 12th Symposium on the Integration of Symbolic Computation and Mechanized Reasoning, 2001.
Orso, Alessandro, Nanjuan Shi, and Mary Jean Harrold. "Scaling regression testing to large software systems." ACM SIGSOFT Software Engineering Notes 29.6 (2004): pp. 241-251. (Year: 2004).
Ratha et al., "A Real-Time Matching System for Large Fingerprint Databases," IEEE, pp. 799-813 (Year: 1996).
Rothermel et al., "Analyzing Regression Test Selection Techniques", IEEE, pp. 529-551 (Year: 1996).
Shu et al., "Testing Security Properties of Protocol Implementations—a Machine Learning Based Approach," IEEE, pp. 1-8 (Year: 2007).
Snelick et al., "Multimodal Biometrics: Issues in Design and Testing," ACM, pp. 68-72 (Year: 2003).
Taneja, Kunal, et al. "eXpress: guided path exploration for efficient regression test generation." Proceedings of the 2011 International Symposium on Software Testing and Analysis. 2011. pp. 1-11 (Year: 2011).
Tsai et al., "Adaptive-Scenario-Based Object-Oriented Test Frameworks for Testing Embedded Systems," IEEE, pp. 1-16 (Year: 2002).
Tsai et al., "Scenario-Based Object-Oriented Test Frameworks for Testing Distributed Systems," IEEE, pp. 1-7 (Year: 2000).
Wikipedia "All pairs testing" retrieved from https://web.archive.org/web/2018031724546/https://en.wikipedia.org/wik/all-pairs_testing (Year: 2018).
Wikipedia "Cartesian Product" web page, from date Jan. 15, 2019, retrieved from https://web.archive.org/web/20190115231627/https://en.wikipedia.org/wiki/Cartesian_product (Year: 2019).
Wilmor, D. et al, "A safe regression test selection technique for database-driven applications." 21st IEEE International Conference on Software Maintenance (ICSM'05). IEEE, 2005, pp. 1-10 (Year: 2005).
Yi, Qiuping, et al. "A synergistic analysis method for explaining failed regression tests." 2015 IEEE/ACM 37th IEEE International Conference on Software Engineering. vol. 1. IEEE, 2015. pp. 257-267 (Year: 2015).
Zhong et al., "TestSage: Regression Test Selection for Large-scale Web Service Testing," IEEE, pp. 430-440 (Year: 2019).

* cited by examiner

CHAMPION TEST CASE GENERATION

BACKGROUND

The present invention relates generally to test case generation, and more particularly, to identifying champion test cases that provide an increased likelihood of detecting a fault.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester. Despite this, CTD testing techniques suffer from various drawbacks, technical solutions to which are described herein.

SUMMARY

In one or more example embodiments, a method for identifying test cases that provide an increased likelihood of fault detection in a System Under Test (SUT) is disclosed. The method includes modeling inputs to the SUT as a plurality of attributes, where each attribute is eligible to take on a respective one or more attribute values and generating multiple sets of test vectors, where each set of test vectors provides a desired amount of coverage of a test space that includes all possible combinations of attribute values. The method further includes generating, for each set of test vectors, a respective corresponding set of test cases and executing each respective corresponding set of test cases to obtain execution results. The method additionally includes determining, based at least in part on the execution results, that a particular test case satisfies criteria for designation as a champion test case and expanding a set of test cases to be executed to include the champion test case.

In one or more other example embodiments, a system for identifying test cases that provide an increased likelihood of fault detection in a System Under Test (SUT) is disclosed. The system includes at least one memory storing computer-executable instructions and at least one processor configured to access the at least one memory and execute the computer-executable instructions to perform a set of operations. The operations include modeling inputs to the SUT as a plurality of attributes, where each attribute is eligible to take on a respective one or more attribute values and generating multiple sets of test vectors, where each set of test vectors provides a desired amount of coverage of a test space that includes all possible combinations of attribute values. The operations further include generating, for each set of test vectors, a respective corresponding set of test cases and executing each respective corresponding set of test cases to obtain execution results. The operations additionally include determining, based at least in part on the execution results, that a particular test case satisfies criteria for designation as a champion test case and expanding a set of test cases to be executed to include the champion test case.

In one or more other example embodiments, a computer program product for identifying test cases that provide an increased likelihood of fault detection in a System Under Test (SUT) is disclosed. The computer program product includes a non-transitory storage medium readable by a processing circuit, the storage medium storing instructions executable by the processing circuit to cause a method to be performed. The method includes modeling inputs to the SUT as a plurality of attributes, where each attribute is eligible to take on a respective one or more attribute values and generating multiple sets of test vectors, where each set of test vectors provides a desired amount of coverage of a test space that includes all possible combinations of attribute values. The method further includes generating, for each set of test vectors, a respective corresponding set of test cases and executing each respective corresponding set of test cases to obtain execution results. The method additionally includes determining, based at least in part on the execution results, that a particular test case satisfies criteria for designation as a champion test case and expanding a set of test cases to be executed to include the champion test case.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
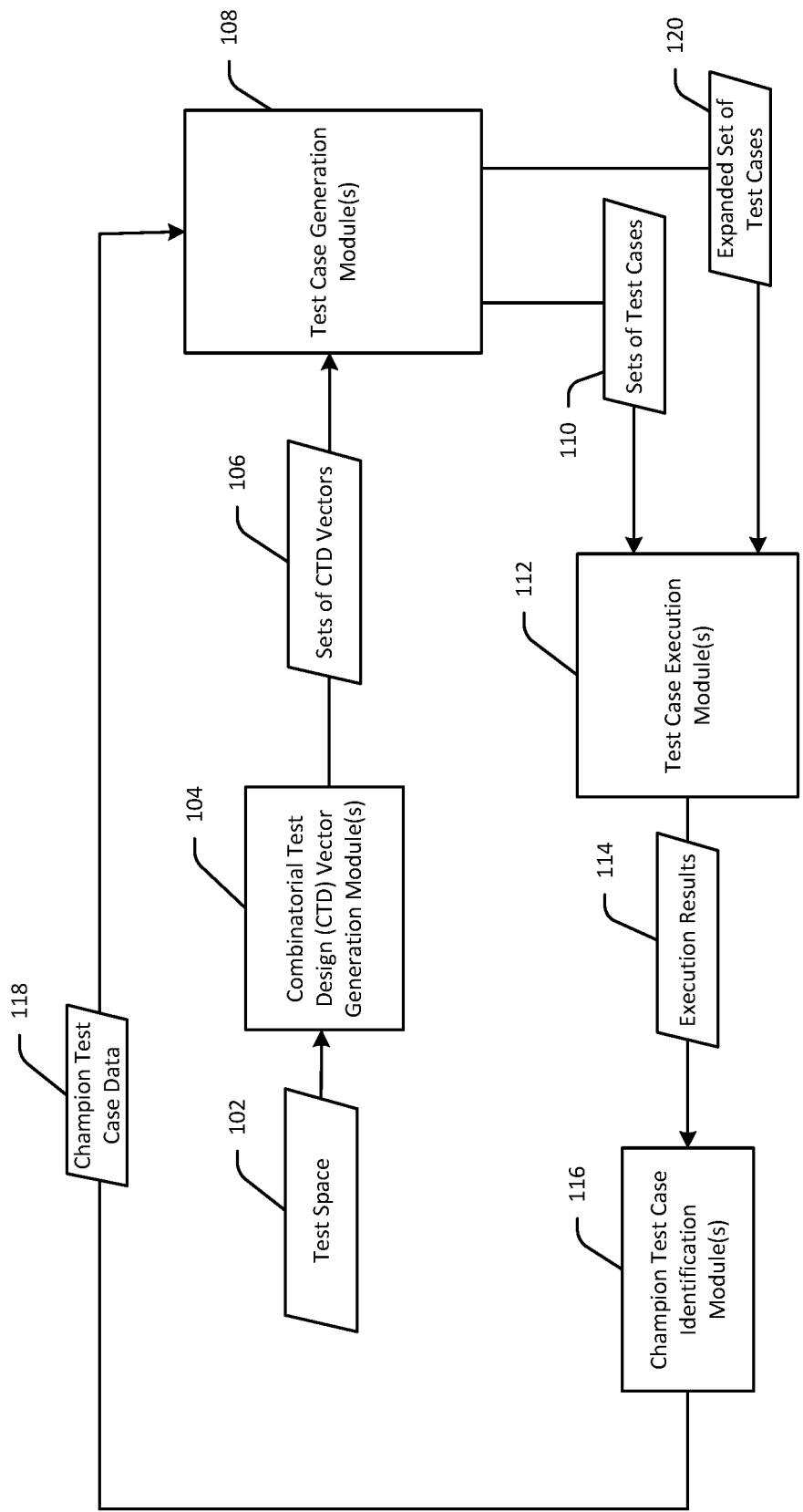
FIG. 1 is a schematic hybrid data flow/block diagram illustrating champion test case identification and expansion of a set of test cases to include a champion test case in accordance with one or more example embodiments of the invention.

Example embodiments of the invention relate to, among other things, devices, systems, methods, computer-readable media, techniques, and methodologies for identifying a champion test case that provides an increased likelihood of exposing a fault and expanding a set of test cases to include the champion test case. In example embodiments, the fault occurs in a System Under Test (SUT). The SUT may be a hardware system or a software system.

In example embodiments, inputs to a SUT may be modeled as a collection of attribute-value pairs. More specifically, inputs to a SUT can be modeled as a collection of attributes, each of which is eligible to take on one or more corresponding attribute values to form attribute-value pairs. For instance, if it is assumed that four different attributes A, B, C, and D are modeled, and if it is further assumed that these attributes can take on four distinct values; three distinct values; three distinct values; and two distinct values, respectively, then the total number of unique combinations of attribute values would be 4*3*3*2=72.

In example embodiments, a set of Combinatorial Test Design (CTD) test vectors may be generated from the test space that includes all possible combinations of attribute values. In particular, in example embodiments, the entire Cartesian product space that contains all possible combinations of attribute-value pairs can be reduced to a smaller set of test vectors that provides complete pairwise coverage, for example, of the test space across all attribute values. For instance, in the example introduced above, the entire Cartesian product space would include 72 different combinations of attribute values. These 72 different combinations can be reduced down to a smaller set of combinations that still provide complete pairwise coverage of the Cartesian product space. In particular, the 72 different combinations can be reduced down to 12 distinct combinations that together include every possible pairwise interaction of attribute values. It should be appreciated that a set of test vectors that provides complete m-wise coverage across the attribute values can also be generated (where m>2), but would require a greater number of test vectors that increases logarithmically as m increases.

In example embodiments, a corresponding set of test cases are generated from the set of CTD vectors that provides the desired amount of coverage of the test space, and the set of test cases are executed to obtain execution results (e.g., a pass or fail result for each test case). In example embodiments, based on the execution results, a particular test case may be selected for expansion via an inverse combinatorics technique described in related co-pending application entitled "Fault detection and localization to generate failing test cases using Combinatorial Test Design techniques" to obtain a new set of test cases designed to detect and localize a fault in the SUT (e.g., a pairwise error that occurs as a result of the interaction of a particular combination of two different attribute values).

In example embodiments, the above-described process can be repeated with different sets of CTD vectors. For instance, in example embodiments, multiple different sets of CTD vectors that each provide complete pairwise coverage of a test space can be generated. Each such set of CTD vectors may include at least one test vector that includes a different combination of attribute values than any test vector in any other set of CTD vectors. In addition, in example embodiments, different sets of CTD vectors that are generated may include the same CTD vector (e.g., the same exact combination of attribute values) from which the same test case is generated. Test cases corresponding to the different sets of CTD vectors can be generated and executed, and one or more of the test cases may expose one or more faults in the SUT.

In example embodiments, as sets of CTD vectors and corresponding test cases are generated and executed, it may be determined that a particular test case tends to expose a fault in the SUT at a greater frequency than other test cases. In example embodiments, such a test case may be designated as a champion test case. A particular test case may be designated as a champion test case based on one or more criteria such as, for example, whether the test case has exposed more than a threshold number of faults; whether the test case has exposed a fault more than a threshold percentage of the number of times the test case is executed; or the like.

In example embodiments, if it is determined that a particular test case should be designated as a champion test case, then champion test case data corresponding to the champion test case may be generated. The champion test case data may include an identifier of the champion test case that can be used to generate the champion test case as well as metadata associated with the champion test case. The identifier of the champion test case may be, for example, the CTD vector from which the champion test case is generated such as a Javascript Object Notation (JSON) string representing the specific combination of attribute values tested by the champion test case. The metadata may include, for example, an indicator that identifies the test case as a champion test case. Further, in example embodiments, the metadata may include a weight applied to the champion test case. The weight applied to the champion test case may indicate a relative strength of the test case in detecting a fault in the SUT as compared to other champion test cases or other test cases generally. For instance, a champion test case that has resulted in the detection of a greater number or percentage of faults may be assigned a larger weight.

In example embodiments, the champion test case data may be provided to a test case generation tool. The test case generation tool may then generate the champion test case using the identifier included in the champion test case data and include the champion test case in a set of test cases to be executed. In certain example embodiments, the test case generation tool may first determine whether the champion test case is already present in the set of test cases and add the champion test case to the set of test cases if determined not to be already present. Further, in example embodiments, the weight assigned to a champion test case may influence the selection of CTD vectors, and thus, the selection of other test cases in the set of test cases to be executed.

For instance, based on the weight applied to the champion test case, the test case generation tool may generate a set of test cases where X percent of the test cases represent variants of the champion test case. As a non-limiting example, if the champion test case has exposed a pairwise error produced by the combination of a first attribute value for a first attribute and a second attribute value for a second attribute, then the test case generation tool may generate a set of test cases, where 20% percent of the test cases include the first attribute value and the second attribute value. In this manner, champion test cases that are more likely to expose a fault in the SUT can be included in a set of test cases—and can potentially influence the selection of other test cases in the set—such that the likelihood that a fault is exposed by one or more test cases in the set is increased. While example embodiments may be described herein in connection with the inclusion of a single champion test case in a set of test cases, it should be appreciated that multiple champion test cases may be included in a set of test cases to be executed.

Example embodiments of the invention include various technical features that yield technical effects that provide various improvements to computer technology. For instance, example embodiments of the invention include the technical feature of identifying champion test cases that expose a greater number of faults in a SUT or expose faults at a greater frequency than other test cases and including such champion test cases in a set of test cases to be executed. Example embodiments of the invention also include the technical feature of weighting champion test cases such that a champion test case with a larger weight results in a greater number or percentage of other test cases that are generated being variants of the champion test case. These technical features yield the technical effect of increasing the likelihood that a set of cases exposes a fault in a SUT. In addition, example embodiments of the invention include technical features that enable a smaller set of champion test cases to be executed quickly while waiting for a larger set of test cases that provides, for example, complete pairwise coverage to execute. This technical feature yields the technical effect of potentially exposing a fault—prior to completion of execution of a set of test cases that provides a desired amount of coverage—based on the execution of the smaller set of champion test cases despite the set of champion test cases potentially not providing complete desired coverage of the test space. These technical effects represent an improvement to debugging and fault detection computer technology by increasing the efficacy of a set of test cases in exposing a fault.

Figure 2:
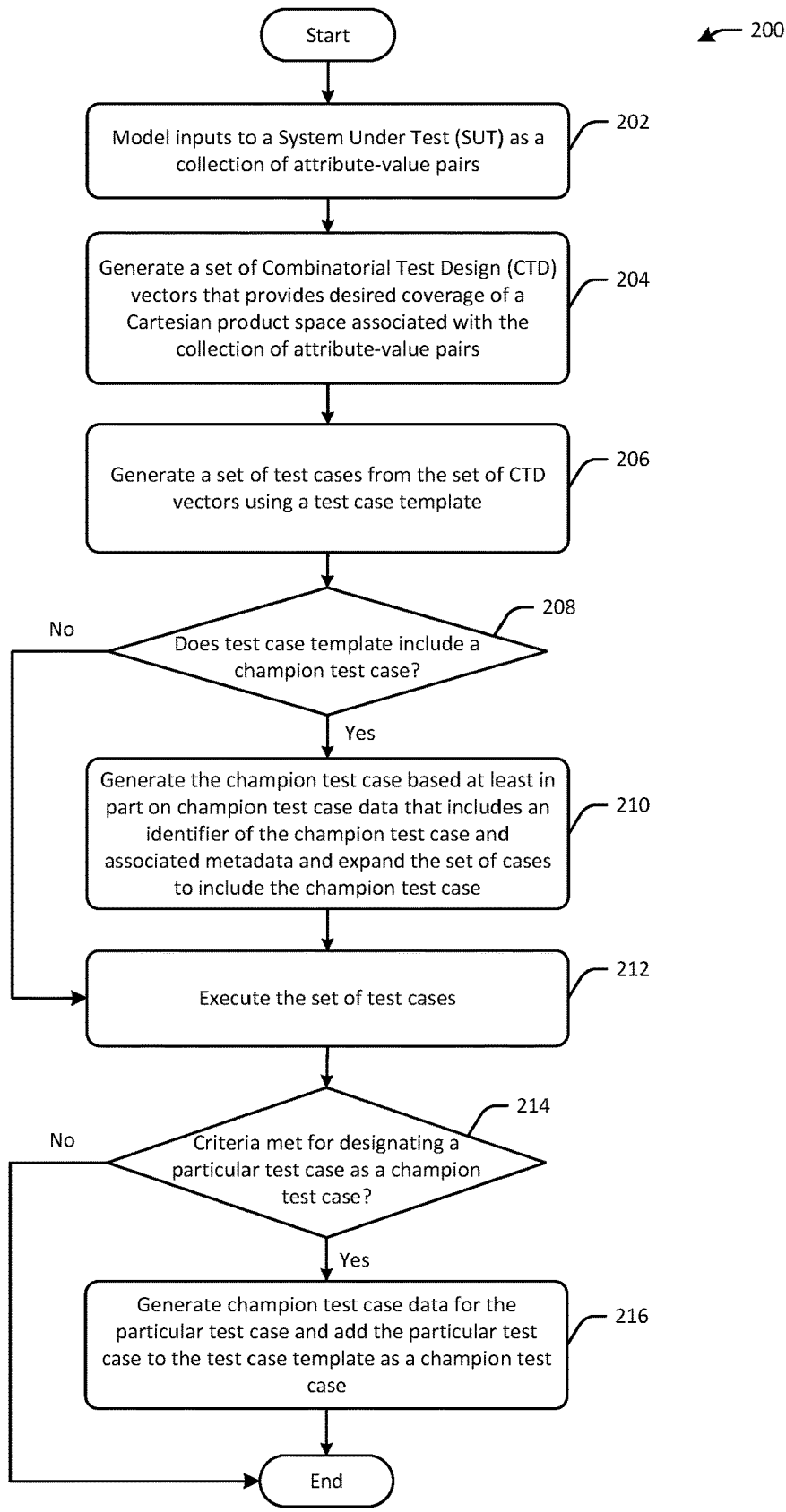
FIG. 2 is a process flow diagram of an illustrative method for identifying a champion test case and expanding a set of test cases to include the champion test case in accordance with one or more example embodiments of the invention.

FIG. 1 is a schematic hybrid data flow/block diagram illustrating champion test case identification and expansion of a set of test cases to include a champion test case in accordance with one or more example embodiments of the invention. FIG. 2 is a process flow diagram of an illustrative method 200 for identifying a champion test case and expanding a set of test cases to include the champion test case in accordance with one or more example embodiments of the invention. FIG. 2 will be described in conjunction with FIG. 1 hereinafter.

Illustrative methods in accordance with example embodiments of the invention and corresponding data structures (e.g., program modules) for performing the methods will now be described. It should be noted that each operation of the method 200 depicted in FIG. 2 may be performed by one or more of the program modules or the like depicted in FIG. 1 or FIG. 3, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 2 in conjunction with FIG. 1, in example embodiments, at block 202 of the method 200, inputs to a SUT are modeled as a collection of attribute value pairs 102. Any number of attributes may be used to model SUT inputs and each attribute may take on any number of candidate attribute values. At block 204 of the method 200, in example embodiments, computer-executable instructions of one or more CTD vector generation modules 104 are executed to generate a reduced set of CTD vectors 106 that provides a desired amount of coverage (e.g., complete pairwise coverage) of a Cartesian product space associated with the collection of attribute-value pairs 102. The reduced set of CTD vectors may include a significantly lesser number of combinations of attribute values than are present in the Cartesian product space, but may nonetheless provide the desired amount of coverage of the Cartesian product space (e.g., complete pairwise coverage). In example embodiments, a binary decision diagram or the like may be used to perform the reduction and identify the set of CTD vectors 106 that provides the desired amount of coverage (e.g., complete pairwise coverage).

Referring again to FIG. 2, at block 206 of the method 200, in example embodiments, computer-executable instructions of one or more test case generation modules 108 may be executed to generate, from the set of CTD test vectors 106, a corresponding set of test cases 110. For instance, the set of CTD test vectors 106 may be provided as input to a test case generation tool such as a test case template that is configured to generate a respective corresponding test case for each CTD vector. Each test case in the set of test cases 110 may be designed to test the interactions among the particular combination of attribute values represented in a corresponding CTD vector of the set of CTD vectors 106. It should be appreciated that a set of CTD vectors and their corresponding test cases may, at times herein, be described and/or depicted interchangeably.

In example embodiments, at block 208 of the method 200, computer-executable instructions of the test case generation module(s) 108 are executed to determine whether the test case template includes a champion test case. In response to a positive determination at block 208, the method 200 proceeds, in example embodiments, to block 210, where computer-executable instructions of the test case generation module(s) 108 are executed to regenerate the champion test case based at least in part on champion test case data 118 associated with the champion test case and to expand the set of test cases 110 to obtain an expanded set of test cases 120 that includes the generated champion test case. As previously described, the champion test case data 118 may include an identifier of the champion test case that can be used to regenerate the champion test case as well as metadata associated with the champion test case. The identifier may be, for example, the CTD vector from which the champion test case was originally generated such as a JSON string representing the specific combination of attribute values tested by the champion test case. The metadata may include, for example, an indicator that identifies the test case as a champion test case. Further, in example embodiments, the metadata may include a weight applied to the champion test case.

In example embodiments, the test case generation module(s) 108 may select, at block 206, certain test cases for inclusion in the set of test cases based on metadata included in the champion test data 118 such as, for example, a weight assigned to a champion test case identified at block 208. Thus, in example embodiments, at least a portion of the test cases depicted in FIG. 2 as being generated at block 206 may be generated subsequent to identification of a champion test case at block 208. For instance, based on the weight applied to the champion test case, the test case generation module(s) 108 may generate a set of test cases where X percent of the test cases represent variants of the champion test case. As a non-limiting example, if the champion test case has exposed a pairwise error produced by the combination of a first attribute value for a first attribute and a second attribute value for a second attribute, then the test case generation module(s) 118 may generate a set of test cases 110, where 20% percent of the test cases include the first attribute value and the second attribute value. In this manner, champion test cases that are more likely to expose a fault in the SUT can be included in a set of test cases 110—and can potentially influence the selection of other test cases in the set 110—such that the likelihood that a fault is exposed by one or more test cases in the set is increased.

From block 210, the method 200 proceeds, in example embodiments, to block 212, where computer-executable instructions of one or more test case execution module(s) 112 are executed to execute the expanded set of test cases 120 that includes the champion test case identified at block 208. In response to a negative determination at block 208, on the other hand, the method 200 may proceed directly to block 212, where the set of test cases 110 (not expanded to include a champion test case) is executed.

In example embodiments, based on the execution results 114 from executing the set of test cases (potentially expanded to include a champion test case) at block 212, one or more test cases may expose a fault in the SUT (e.g., a pairwise error that occurs as a result of the interaction of a particular combination of two different attribute values). In example embodiments, the above-described process can be repeated with different sets of CTD vectors. In particular, while each CTD vector in the set of CTD vectors 106 includes a unique combination of attribute values, the set of CTD vectors 106 itself may not be unique. That is, there may be multiple different sets of CTD vectors 106, each of which provides a desired amount of coverage (e.g., complete pairwise coverage). Each such set of CTD vectors 106 may include at least one test vector that includes a different combination of attribute values than any test vector in any other set of CTD vectors. In addition, in example embodiments, different sets of CTD vectors 106 that are generated may include the same CTD vector (e.g., the same exact combination of attribute values) from which the same test case is generated. Test cases 110 corresponding to the different sets of CTD vectors can be generated and executed, and one or more of the test cases may expose one or more faults in the SUT.

In example embodiments, as sets of CTD vectors 106 and corresponding test cases 110 are generated and executed, computer-executable instructions of one or more champion test case identification modules 116 may be executed, at block 214 of the method 200, to determine, based on the execution results 114 for the sets of test cases 110, whether any test case satisfies one or more criteria for designation as a champion test case. The criteria may include, for example, whether a particular test case has exposed a fault when executing the set of test cases as part of a current iteration of the method 200; whether the test case has exposed more than a threshold number of faults; whether the test case has exposed a fault more than a threshold percentage of the times the test case is executed; or the like.

In example embodiments, if it is determined, at block 214, that no test case satisfies the criteria for designation as a champion test case, the method 200 may end. If, on the other hand, it is determined that a particular test case should be designated as a champion test case—corresponding to a positive determination at block 214—then computer-executable instructions of the champion test case identification module(s) 116 may be executed, at block 216 of the method 200, to generate champion test case data 118 corresponding to the champion test case and to add the particular test case to the test case template as a champion test case. The champion test case data 118 may include an identifier of the champion test case that can be used to generate the champion test case as well as metadata associated with the champion test case. In certain example embodiments, the test case generation module(s) 108 may first determine whether the champion test case is already present in the test case template and add the champion test case to the test case template only if determined not to be already present.

The identifier of the champion test case may be, for example, the CTD vector from which the champion test case is generated such as a JSON string representing the specific combination of attribute values tested by the champion test case. The metadata may include, for example, an indicator that identifies the test case as a champion test case. Further, in example embodiments, the metadata may include a weight applied to the champion test case. The weight applied to the champion test case may indicate a relative strength of the test case in detecting a fault in the SUT as compared to other champion test cases or other test cases generally. For instance, a champion test case that has resulted in the detection of a greater number or percentage of faults may be assigned a larger weight.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 3:
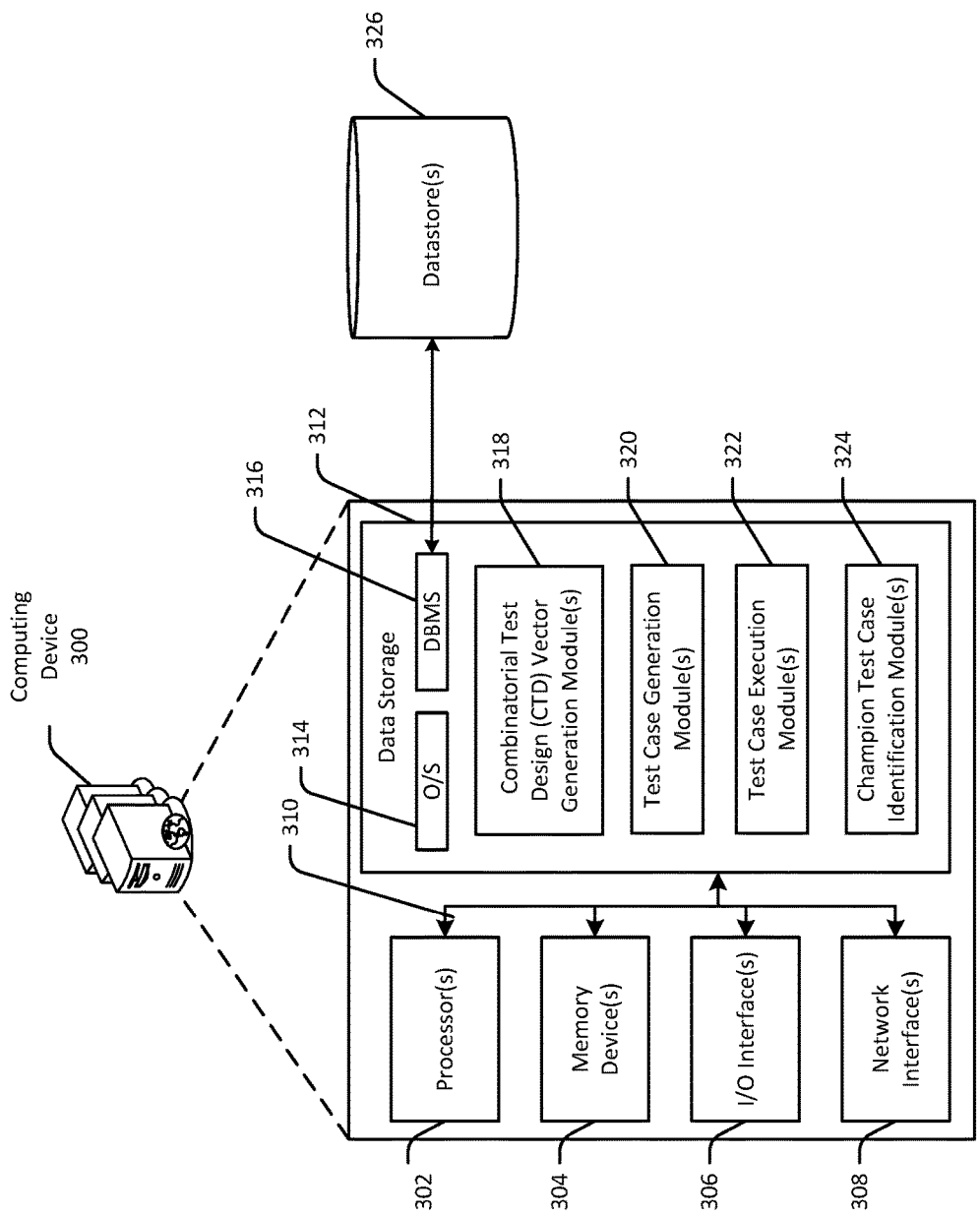
FIG. 3 is a schematic diagram of an illustrative computing device configured to implement one or more example embodiments of the invention.

FIG. 3 is a schematic diagram of an illustrative computing device 300 configured to implement one or more example embodiments of the invention. The illustrative computing device 300 may include a server or collection of servers; a personal computer; a handheld device; or the like. While the computing device 300 and/or any particular component of the computing device 300 may be described herein in the singular, it should be appreciated that multiple instances of the computing device 300 and/or any component thereof may be provided and functionality described in connection with the computing device 300 may be distributed across multiple computing devices 300 and/or across multiple instances of any particular component of the computing device 300.

In an illustrative configuration, the computing device 300 may include one or more processors (processor(s)) 302, one or more memory devices 304 (generically referred to herein as memory 304), one or more input/output ("I/O") interfaces 306, one or more network interfaces 308, and data storage 312. The computing device 300 may further include one or more buses 310 that functionally couple various components of the computing device 300.

The bus(es) 310 may include at least one of a system bus, a memory bus, an address bus, or a message bus, and may permit the exchange of information (e.g., data (including computer-executable code), signaling, etc.) between various components of the computing device 300. The bus(es) 310 may include, without limitation, a memory bus or a memory controller, a peripheral bus, an accelerated graphics port, and so forth. The bus(es) 310 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 304 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 312 may include removable storage and/or non-removable storage including, but not limited to, magnetic storage, optical disk storage, and/or tape storage. The data storage 312 may provide non-volatile storage of computer-executable instructions and other data. The memory 304 and the data storage 312, removable and/or non-removable, are examples of computer-readable storage media (CRSM) as that term is used herein.

The data storage 312 may store computer-executable code, instructions, or the like that may be loadable into the memory 304 and executable by the processor(s) 302 to cause the processor(s) 302 to perform or initiate various operations. The data storage 312 may additionally store data that may be copied to memory 304 for use by the processor(s) 302 during the execution of the computer-executable instructions. Moreover, output data generated as a result of execution of the computer-executable instructions by the processor(s) 302 may be stored initially in memory 304 and may ultimately be copied to data storage 312 for non-volatile storage.

More specifically, the data storage 312 may store one or more operating systems (O/S) 314; one or more database management systems (DBMS) 314 configured to access the memory 304 and/or one or more external datastores 326; and one or more program modules, applications, engines, managers, computer-executable code, scripts, or the like such as, for example, one or more CTD vector generation modules 318; one or more test case generation modules 320; one or more test case execution modules 322; and one or more champion test case identification modules 324. Any of the components depicted as being stored in data storage 312 may include any combination of software, firmware, and/or hardware. The software and/or firmware may include computer-executable instructions (e.g., computer-executable program code) that may be loaded into the memory 304 for execution by one or more of the processor(s) 302 to perform any of the operations described earlier in connection with correspondingly named modules/engines.

Although not depicted in FIG. 3, the data storage 312 may further store various types of data utilized by components of the computing device 300 (e.g., data stored in the datastore (s) 326). Any data stored in the data storage 312 may be loaded into the memory 304 for use by the processor(s) 302 in executing computer-executable instructions. In addition, any data stored in the data storage 312 may potentially be stored in the external datastore(s) 326 and may be accessed via the DBMS 314 and loaded in the memory 304 for use by the processor(s) 302 in executing computer-executable instructions.

The processor(s) 302 may be configured to access the memory 304 and execute computer-executable instructions loaded therein. For example, the processor(s) 302 may be configured to execute computer-executable instructions of the various program modules, applications, engines, managers, or the like of the computing device 300 to cause or facilitate various operations to be performed in accordance with one or more embodiments of the invention. The processor(s) 302 may include any suitable processing unit capable of accepting data as input, processing the input data in accordance with stored computer-executable instructions, and generating output data. The processor(s) 302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 302 may be capable of supporting any of a variety of instruction sets.

Referring now to other illustrative components depicted as being stored in the data storage 312, the O/S 314 may be loaded from the data storage 312 into the memory 304 and may provide an interface between other application software executing on the computing device 300 and hardware resources of the computing device 300. More specifically, the O/S 314 may include a set of computer-executable instructions for managing hardware resources of the computing device 300 and for providing common services to other application programs. In certain example embodiments, the O/S 314 may include or otherwise control the execution of one or more of the program modules, engines, managers, or the like depicted as being stored in the data storage 312. The O/S 314 may include any operating system now known or which may be developed in the future including, but not limited to, any server operating system, any mainframe operating system, or any other proprietary or non-proprietary operating system.

The DBMS 314 may be loaded into the memory 304 and may support functionality for accessing, retrieving, storing, and/or manipulating data stored in the memory 304, data stored in the data storage 312, and/or data stored in external datastore(s) 326. The DBMS 314 may use any of a variety of database models (e.g., relational model, object model, etc.) and may support any of a variety of query languages. The DBMS 314 may access data represented in one or more data schemas and stored in any suitable data repository. Data stored in the datastore(s) 326 may include, for example, data indicative of CTD vectors and corresponding test cases; champion test case data; and so forth, any portion of which may alternatively or additionally be stored in the data storage 312. External datastore(s) 326 that may be accessible by the computing device 300 via the DBMS 314 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 300, the input/output (I/O) interface(s) 306 may facilitate the receipt of input information by the computing device 300 from one or more I/O devices as well as the output of information from the computing device 300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 300 or may be separate. The I/O devices may further include, for example, any number of peripheral devices such as data storage devices, printing devices, and so forth.

The I/O interface(s) 306 may also include an interface for an external peripheral device connection such as universal serial bus (USB), FireWire, Thunderbolt, Ethernet port or other connection protocol that may connect to one or more networks. The I/O interface(s) 306 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 300 may further include one or more network interfaces 308 via which the computing device 300 may communicate with any of a variety of other systems, platforms, networks, devices, and so forth. The network interface(s) 308 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 3 as being stored in the data storage 312 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 300 and/or other computing devices may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 300 may include alternate and/or additional hardware, software, or firmware components beyond those described or depicted without departing from the scope of the invention. More particularly, it should be appreciated that software, firmware, or hardware components depicted as forming part of the computing device 300 are merely illustrative and that some components may not be present or additional components may be provided in various embodiments. While various illustrative modules have been depicted and described as software modules stored in data storage 312, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 may be performed by one or more computing devices 300 having the illustrative configuration depicted in FIG. 3, or more specifically, by one or more program modules, engines, applications, or the like executable on such a device. It should be appreciated, however, that such operations may be implemented in connection with numerous other device configurations.

The operations described and depicted in the illustrative method of FIG. 2 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 2 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying test cases that provide an increased likelihood of fault detection in a System Under Test (SUT), the method comprising:
   modeling inputs to the SUT as a plurality of attributes, wherein each attribute is eligible to take on a respective one or more attribute values;
   generating a plurality of sets of test vectors, wherein each set of test vectors provides a desired amount of coverage of a test space that includes all possible combinations of attribute values;
   generating, for each set of test vectors, a respective corresponding set of test cases;
   executing each respective corresponding set of test cases to obtain execution results;
   determining, based at least in part on the execution results, that a particular test case satisfies criteria for designation as a champion test case, wherein the champion test case exposes a pairwise error produced by a combination of a first attribute value for a first attribute and a second attribute value for a second attribute;
   generating champion test case data corresponding to the particular test case, the champion test case data comprising a weight value assigned to the champion test case based on the criteria, the weight value representing a relative strength of the champion test case compared to other champion test cases, the weight value based on a number of faults detected when executing the champion test case; and
   generating a set of test cases to be executed to include the champion test case, wherein at least a predetermined number of test cases in the set of test cases are variants of the champion test case and include the first attribute value and the second attribute value, number of test cases in the set of test cases is based on the weight value assigned to the champion test case.

2. The method of claim 1, wherein determining that the particular test case satisfies the criteria for designation as the champion test case comprises determining that the particular test case has exposed more than a threshold number of faults.

3. The method of claim 1, wherein determining that the particular test case satisfies the criteria for designation as the champion test case comprises determining that the particular test case has exposed a fault more than a threshold percentage of a number of times the particular test case is executed.

4. The method of claim 1, further comprising:
   generating champion test case data corresponding to the particular test case responsive at least in part to determining that the particular test case satisfies the criteria for designation as the champion test case; and
   regenerating the champion test case based at least in part on the champion test case data.

5. The method of claim 1, further comprising:
   selecting one or more test cases for inclusion in the expanded set of test cases based at least in part on the weight value assigned to the champion test case, wherein selecting the one or more test cases comprises selecting a threshold number of test cases that each test a particular combination of two or more attribute values tested by the champion test case.

6. A system for identifying test cases that provide an increased likelihood of fault detection in a System Under Test (SUT), the system comprising:
   at least one processor; and
   at least one memory storing computer-executable instructions, wherein the at least one processor is configured to access the at least one memory and execute the computer-executable instructions to:
      model inputs to the SUT as a plurality of attributes, wherein each attribute is eligible to take on a respective one or more attribute values;
      generate a plurality of sets of test vectors, wherein each set of test vectors provides a desired amount of coverage of a test space that includes all possible combinations of attribute values;
      generate, for each set of test vectors, a respective corresponding set of test cases;
      execute each respective corresponding set of test cases to obtain execution results;
      determine, based at least in part on the execution results, that a particular test case satisfies criteria for designation as a champion test case, wherein the champion test case exposes a pairwise error produced by a combination of a first attribute value for a first attribute and a second attribute value for a second attribute;
      generate champion test case data corresponding to the particular test case, the champion test case data comprising a weight value assigned to the champion test case based on the criteria, the weight value representing a relative strength of the champion test case compared to other champion test cases, the weight value based on a number of faults detected when executing the champion test case; and
      generate a set of test cases to be executed to include the champion test case, wherein at least a predetermined number of test cases in the set of test cases are variants of the champion test case and include the first attribute value and the second attribute value, number of test cases in the set of test cases is based on the weight value assigned to the champion test case.

7. The system of claim 6, wherein the at least one processor is configured to determine that the particular test case satisfies the criteria for designation as the champion test case by executing the computer-executable instructions to determine that the particular test case has exposed more than a threshold number of faults.

8. The system of claim 6, wherein the at least one processor is configured to determine that the particular test case satisfies the criteria for designation as the champion test case by executing the computer-executable instructions to determine that the particular test case has exposed a fault more than a threshold percentage of a number of times the particular test case is executed.

9. The system of claim 6, wherein the at least one processor is further configured to execute the computer-executable instructions to:
   generate champion test case data corresponding to the particular test case responsive at least in part to determining that the particular test case satisfies the criteria for designation as the champion test case; and
   regenerate the champion test case based at least in part on the champion test case data.

10. The system of claim 9, wherein the champion test case data comprises an identifier of the champion test case and metadata associated with the champion test case, and wherein the at least one processor is configured to regenerate the champion test case by executing the computer-executable instructions to generate the champion test case based at least in part on the identifier.

11. The system of claim 6, wherein the at least one processor is further configured to execute the computer-executable instructions to:

select one or more test cases for inclusion in the expanded set of test cases based at least in part on the weight value assigned to the champion test case, wherein the at least one processor is configured to select the one or more test cases by executing the computer-executable instructions to select a threshold number of test cases that each test a particular combination of two or more attribute values tested by the champion test case.

12. A computer program product for identifying test cases that provide an increased likelihood of fault detection in a System Under Test (SUT), the computer program product comprising a non-transitory storage medium readable by a processing circuit, the storage medium storing instructions executable by the processing circuit to cause a method to be performed, the method comprising:

modeling inputs to the SUT as a plurality of attributes, wherein each attribute is eligible to take on a respective one or more attribute values;

generating a plurality of sets of test vectors, wherein each set of test vectors provides a desired amount of coverage of a test space that includes all possible combinations of attribute values;

generating, for each set of test vectors, a respective corresponding set of test cases;

executing each respective corresponding set of test cases to obtain execution results;

determining, based at least in part on the execution results, that a particular test case satisfies criteria for designation as a champion test case, wherein the champion test case exposes a pairwise error produced by a combination of a first attribute value for a first attribute and a second attribute value for a second attribute;

generating champion test case data corresponding to the particular test case, the champion test case data comprising a weight value assigned to the champion test case based on the criteria, the weight value representing a relative strength of the champion test case compared to other champion test cases, the weight value based on a number of faults detected when executing the champion test case; and generating a set of test cases to be executed to include the champion test case, wherein at least a predetermined number of test cases in the set of test cases are variants of the champion test case and include the first attribute value and the second attribute value, number of test cases in the set of test cases is based on the weight value assigned to the champion test case.

13. The computer program product of claim 12, wherein determining that the particular test case satisfies the criteria for designation as the champion test case comprises determining that the particular test case has exposed more than a threshold number of faults.

14. The computer program product of claim 12, wherein determining that the particular test case satisfies the criteria for designation as the champion test case comprises determining that the particular test case has exposed a fault more than a threshold percentage of a number of times the particular test case is executed.

15. The computer program product of claim 12, the method further comprising:

generating champion test case data corresponding to the particular test case responsive at least in part to determining that the particular test case satisfies the criteria for designation as the champion test case, wherein the champion test case data comprises an identifier of the champion test case and metadata associated with the champion test case; and regenerating the champion test case based at least in part on the identifier.

16. The computer program product of claim 12, the method further comprising:

selecting one or more test cases for inclusion in the expanded set of test cases based at least in part on the weight value assigned to the champion test case, wherein selecting the one or more test cases comprises selecting a threshold number of test cases that each test a particular combination of two or more attribute values tested by the champion test case.

* * * * *